Figure 1:
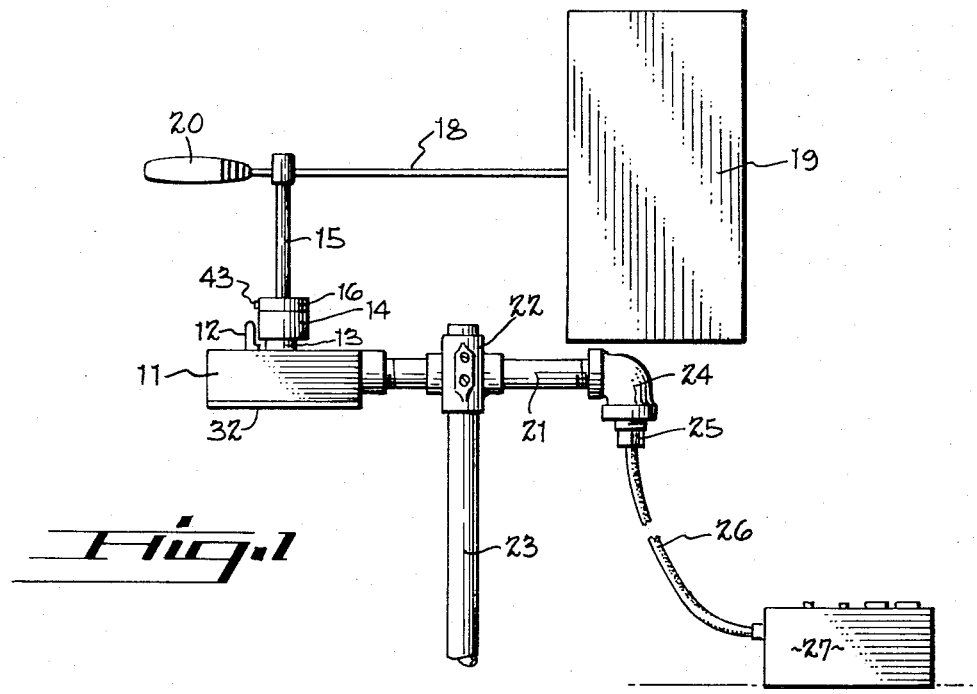

Jan. 23, 1968   LAN J. WONG   3,364,740
WIND VANE POSITION SENSING DEVICE
Filed March 31, 1965   2 Sheets-Sheet 1

INVENTOR.
LAN J. WONG
BY
ATTORNEY

Jan. 23, 1968  LAN J. WONG  3,364,740
WIND VANE POSITION SENSING DEVICE
Filed March 31, 1965  2 Sheets-Sheet 2
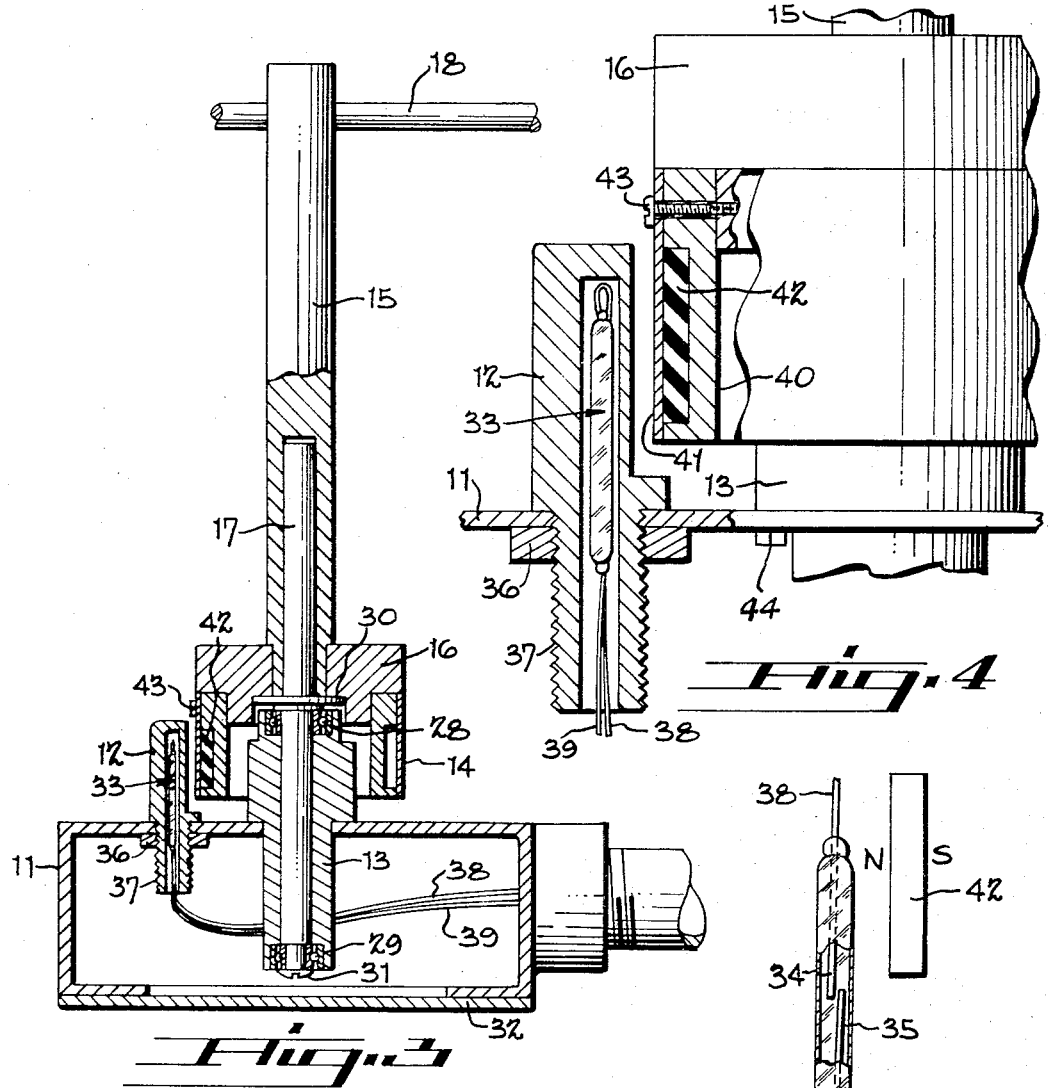
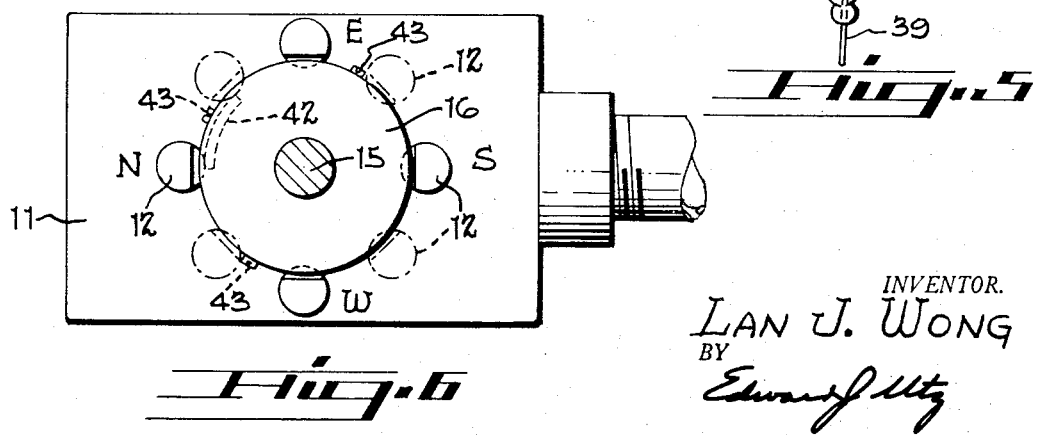
INVENTOR.
LAN J. WONG
BY
Edward J. Utz
ATTORNEY United States Patent Office 3,364,740
Patented Jan. 23, 1968

3,364,740
WIND VANE POSITION SENSING DEVICE
Lan J. Wong, 3357 Madison Road,
Cincinnati, Ohio 45209
Filed Mar. 31, 1965, Ser. No. 444,174
1 Claim. (Cl. 73—188)

This invention relates to a new and improved means for sensing the position of a wind vane such as is used in meteorological work. When meteorological observations were first begun, the wind vane served as a visual device in which the vane was pivoted to swing freely and follow the direction of the wind, but had no means for providing any indication outside of the visual observation. As the work progressed, there was a need for providing a means of remote indications so that the observer would not have to go out into the weather, but could conveniently watch an indicating device located on the interior of the building or edifice to which the wind vane unit was connected through means of an electrical cable. For many years a favorite means of sensing the wind vane position was to employ a series of commutator segments arranged in a circle about the vane axis which were contacted in turn by a brush contact attached to the wind vane. This contact would move in conjunction with the vane and thus serve as a means of indicating position by the completion of an electrical circuit with the appropriate commutator segment disposed radially under it. On occasions a series of switches were disposed in a circle under the vane and these switches were closed by a camming device carried by the vane and moving with it. With the development of so-called low torque instrument potentiometers, it was possible to attach such a potentiometer to a wind vane to provide continuous position indication or recording means with good angular resolution.

One of the most important and desirable characteristics of a wind vane system is that it should provide a true indication of wind behavior at all wind speeds. The lower limit of wind speed at which the wind will respond and follow is called the threshold. This threshold is determined by the relation between the size of the wind vane and the amount of frictional resistance occasioned by the pivot supports and the sensing means. Wind vanes employing either the commutator and brush or the cam and switch principle for obtaining position indication, have thresholds ranging from 2 m.p.h. to 3 m.p.h. at best. The most sensitive of the so-called low torque potentiometer systems have a threshold response of between .6 m.p.h. to .75 m.p.h. of wind speed. The new position indicating means to be described has negligible resistance to motion of the vane and permits of a vane threshold response of 0.3 m.p.h. thus permitting of a performance that is unequal by any other means so far used.

Another desirable and important feature of the wind vane position sensing system is durability in operation. In cases where commutator segments with a rotating brush contact are used, weathering causes oxidation of the contact surfaces with resultant erratic contact and unreliable indications after a period of even weeks, depending upon the corrosiveness of the atmosphere. The cam and switch devices are also subject to corrosion of the switch points. The low torque potentiometers minimize corrosive effects by using expensive precious metal contacts. Another problem is wear of sliding or moving parts. The commutator and brush arrangement does have wear which will necessitate eventual refinishing of the commutator surfaces as well as readjustment of the brush to maintain reliable contact. The low torque potentiometers are usually rated for a total of 1 to 3 million cycles of operation before the rotating contact might wear out. When it is considered that under gusty conditions the wind can fluctuate at the rate of 800 times per hour, it is seen that the low torque potentiometer contact might wear out in a matter of a few months of operation. The new position sensing means to be described incorporates a hermetically sealed switch contact which is unaffected by corrosive atmosphere or weathering and the switch carries a nominal life rating of up to 50,000,000 operations. Thus, it can be seen that the new means will provide far greater reliability and durability of operation.

One of the primary objects of this invention is to provide a simple, durable means for position sensing with negligible coercion of the wind vane motion. Another object is to provide a means for sensing over a predetermined angle of wind movement. Another object of the invention is to provide for a means of easily changing the wind vane position angle which is being sensed. A part of this invention concerns the discovery of a new technique for actuating the magnetic switch which will be hereinafter described.

The simplest arrangement for the new invention is that in which a single position sensing means is provided in conjunction with the wind vane. This typical arrangement is applicable and useful for such purposes as a wind direction alarm or a wind direction control serving to notify the observer in a factory when the wind is coming from a preset direction sector or serving through the intermediary of relays to control the shut down or start up of various types of equipment. This last use may be illustrated by the application in which the wind direction control is used for air pollution studies. In cases where it is necessary to locate a source of pollutant in the air, it is possible to employ the wind direction control, to be described, for the operation of air sampling equipment in such a fashion that one air sampler will be turned on only when the wind is in the direction sector set by the wind direction control unit, and the other air sampler is operated only when the wind is not in the direction sector set by the wind direction control. Analysis of the results of the two air sampler can then provide a means for determining in which direction the source of air pollutants is located. By using a series of differently located sampling sites, it is then possible to pinpoint this source of pollutant.

Figure 2:
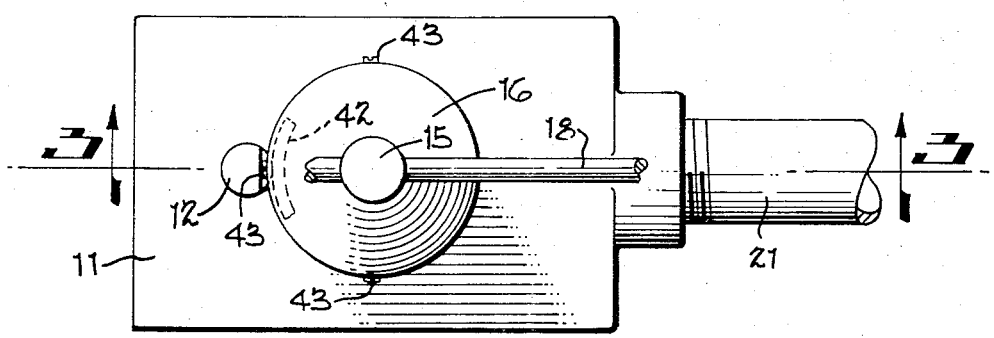

FIGURE 1 is a view in side elevation of the wind vane device.
FIGURE 2 is a top plan view of my device.
FIGURE 3 is a detailed sectional view taken along the lines 3—3 looking in the direction of the arrows.
FIGURE 4 is a detailed partial sectional view of a portion of FIGURE 3.
FIGURE 5 is a view in side elevation of the switch and magnet.
FIGURE 6 is a top plan view showing a plurality of switches.

In the drawings the same reference numerals refer to the same parts throughout the several views.

In FIGURE 1 I show a sensor box 11, having a cover member 32, which carries a switch housing 12 and a bearing support 13 about which is located a sensor actuating ring indicated generally at 14. A vane shaft 15 is mounted for rotation on the sensor box 11. The vane shaft is provided with a flange 16 for mounting sensor actuating ring 14. The shaft 15 has fixed to it a vane arm 18 at one end of which is carried a vane 19 balanced at its other end by a counterweight 20. The sensor box 11 has connected to its one end a stub cross arm 21 and a cross arm T fitting 22 which is affixed to a mast 23 for mounting the device. Secured to the cross arm 21 is an elbow 24 closed at its lower end with a plug 25. A cable 26 connects through plug 25 into sensor box 11 and to switch housing 12 while the lower end attaches to a controlled member 27.

The vane 19, which is secured to the vane arm 18, and which has a counterweight 20, rotates with the vane shaft 15, which is normal to the vane arm 18. The sensor box 11 has a bearing support 13 located therein and a rotatable spindle 17 mounted in bearing support 13 in ball bearings 28 and 29, secured by means of a screw 31 against spindle baffle 30 (FIGURE 3). The vane shaft 15 has a flange 16 provided at its lower end and is rotatable with said vane shaft. The sensor actuating ring 14 is mounted on the flange 16 by means of screws 43 and the magnet 42 is carried within said ring. A reed switch 33, having contact arms 34 and 35 and connecting to wires 38 and 39, is provided within the switch housing 12. This reed switch 33 is mounted on said sensor box 11 adjacent to the sensor actuating ring 14. The reed switch leads 38 and 39 connect said switch through cable 26 to a controlled member 27. Variations in wind direction cause the wind vane to assume a selected position whereby said magnet is positioned adjacent to said reed switch 33 causing a contact closure signal to be sent to said controlled member to actuate means for shutting down or starting up various types of equipment through power relays.

In FIGURE 4 I show a flange 16 of the vane shaft 15, a grooved ring 40 set in a magnet 42 secured in position by casing 41. The sensor actuating ring assembly 14, previously described is secured to the lower part of flange 16 by means of screws 43. The switch housing 12 is positioned against the top of sensor box 11 and is provided at its lower end with a threaded portion 37 which receives a nut 36 and holds the switch housing 12 which carries the reed switch 33. The bearing support 13 is secured on the top of the sensor box 11 by screws such as screw 44.

In FIGURE 6 I show an assembly having a plurality of switch housings such as 12 positioned in equally spaced relationship about the vane shaft 15. The magnet 42 is of such length as to subtend an arcuate angle equal to the spacing between adjacent switch housing 12, each of which carries a reed switch 33. By positioning the sensor box 11 in true compass pattern actuation of the switches are accomplished in response to wind direction centering about each of eight cardinal points. This permits the use of my invention as a wind direction sensor.

Inherent in this invention was the discovery that the magnetic reed switch could be operated or actuated through the medium of a flexible magnet consisting of barium titanate held in a rubber binder and in the form of a flat strip. The magnetic characteristics of the magnet material are as follows: residual induction—2100 gauss; coercive force—1300 oersteds; maximum energy product—900,000 gauss oersteds. This material in conjunction with a reed switch having the following characteristics form a cooperating sensing means. The characteristic sensitivity of the magnetic reed switch used in the application is such that it will actuate under the condition in which it is enclosed by a coil through which current equivalent to a product of 40 ampere turns is passed. A further feature of this discovery results in some mechanical advantages in the design of the equipment. It is the usual practice to actuate the magnetic reed switch either by means of enclosing it within an electric coil or by use of a permanent magnet having a north and south pole, one pole on each end of the magnet. This magnet would then be centrally disposed so that the north pole would align opposite to one end of the switch and the south pole would align with the other end of the switch, thus inducing magnetism into the switch reed contacts of opposite polarity and causing them to become attracted towards each other at the open junction when the magnetic force is sufficiently high. In this discovery it was found that by magnetizing the flexible ribbon such that the north pole would emerge perpendicular to one flat face and the south pole would emerge perpendicular to the opposite flat face, it is possible to energize the reed switch and activate the contact closure merely by exposing less than half of the switch length to the magnet. This is illustrated in FIGURE 5, wherein is shown a sectional view of the magnetic reed switch and the cooperating position of the magnet which actuates the switch. With this approach it is possible to obtain much more latitude in the spacial relationship along the longitudinal axis of the switch between the switch reeds and the magnet itself. This latitude is of help in guaranteeing proper action of the elements in spite of production tolerances for the parts which are used to assemble the equipment. To gain an appreciation of the actual size and distances involved, the magnetic reed switch used in the invention has a length overall (from end to end of the glass sealed envelope) of 7/8 inch. It has a diameter of 3/32 inch. The magnetic strip is 5/8 inch high by 1/10 inch thick and of a suitable length as dictated by the angular sensing value which is desired. Under normal procedures the magnet with poles at its ends would have to be at least 1/2 inch to 5/8 inch long and centrally located with respect to the switch in order to actuate it. In the case as illustrated in FIGURE 5, the exposure of the switch to the magnet, need not be over 3/8 inch of overlap of the switch body with respect to the magnet forces, thus effecting a saving of 3/8 inch in the protuberance of the switch housing from the top of the sensor box. It has also been found that the working distance is enhanced by the new arrangement in that switch actuation can occur at a distance of 1/8 inch away using the new method, while with the old method the same strength magnet would need to be located at 1/16 inch from the switch to cause actuation. One advantage of the smaller overlap of the magnetic reed switch with the actuating magnet lies in the fact that the switch housing 12 need not project as far up above the sensor box 11. In this way the amount of undesirable turbulence developed by any projections above the sensor box surface is minimized. The parts relevant to the switch housing and the interchangeable sensor rings are also easier to make and therefore more economical of production by the new method. The angle of wind vane sensing is determined by the length of magnetic strip which is wrapped in its holding groove inside of the sensing ring assembly. Consequently, it is a simple matter to produce rings with practically any desired sensing angle for use in the apparatus. The perferred orientation of the magnet, with respect to the wind vane axis is that in which the wind vane bisects the sensing angle determined by the magnet itself, operating in conjunction with the sensing switch. This is illustrated in FIGURE 2. An indexing feature is provided for in the mounting of the sensor ring onto the vane shaft flange to permit maintaining the desired orientation between the elements. This indexing is accomplished by the use of three screws. One disposed along the central bisector of the sensing angle as determined by the magnet, and one each at 90 degrees away from this central screw. Consequently, if all three screws are used for fastening the sensor ring onto the vane shaft, then only the desired orientation can be used in order that the holes for the screws will match up. It can be noted that the sensor ring assembly, when fastened onto the flange of the vane shaft and the vane shaft seated in position in the spindle, together form a baffle shield to protect the top ball bearing against the settlement of any particular material which might cause damage to the bearing or impair its freedom of rotation.

Having thus described my invention, what I claim as new and useful and desire to secure by U.S. Letters Patent is:

1. In a wind vane of the class having a controlled member actuated by a sensing device responsive to wind direction, comprising a vane, a vane arm fixed at one end to said vane, a counterweight fixed at the end opposite of said vane to said vane arm, a vane shaft normal to said vane arm for carrying said vane arm, and positioned at the center of gravity of the vane arm, counterweight and vane, a sensor box, a bearing support in said sensor box, a rotatable spindle in said bearing support, said vane shaft mounted at its lowermost end to said spindle in said sensor box, a flange provided at the lower end of said vane shaft and rotatable with said shaft, an interchangeable sensor actuating ring with a selected sensing angle mounted on said flange, said ring coaxially mounted with respect to said shaft, a magnet of predetermined length suited to the desired sensing angle carried within said ring, with its longitudinal axis being disposed horizontally along the periphery of said ring, a plurality of reed switches mounted in said sensor box adjacent to and out of mechanical contact with said sensor actuating ring, and mounted in a circle coaxially of said ring, electrical connections from said switches to a controlled member whereby said controlled member is operative in response to variations in wind direction causing positioning of said magnet adjacent to said reed switches.

References Cited

UNITED STATES PATENTS

| | | | |
|---|---|---|---|
| 2,592,583 | 4/1952 | Lyon | 73—189 |
| 2,600,011 | 6/1952 | MacDonald et al. | 200—81.9 |
| 2,611,051 | 9/1952 | Kolff | 73—188 X |
| 2,870,383 | 1/1959 | Mazzarella | 73—189 X |
| 3,055,215 | 9/1962 | Ivie | 73—188 |
| 3,069,907 | 12/1962 | Eddy | 73—189 X |
| 3,282,099 | 11/1966 | Kingman | 73—189 |
| 3,299,700 | 1/1967 | Stout | 73—421.5 |

RICHARD C. QUEISSER, *Primary Examiner.*

JAMES J. GILL, *Examiner.*

J. J. SMITH, J. W. MYRACLE, *Assistant Examiners.*